(12) United States Patent
Lee et al.

(10) Patent No.: US 9,942,273 B2
(45) Date of Patent: Apr. 10, 2018

(54) DYNAMIC DETECTION AND RECONFIGURATION OF A MULTI-TENANT SERVICE

(71) Applicant: International Business Machines Corporation, Armonk, NY (US)

(72) Inventors: Cheng-Ta Lee, Taipei (TW); Ronald Becker Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/964,191

(22) Filed: Dec. 9, 2015

(65) Prior Publication Data

US 2017/0171245 A1 Jun. 15, 2017

(51) Int. Cl.
*H04L 29/06* (2006.01)
*G06F 17/30* (2006.01)

(52) U.S. Cl.
CPC ........ *H04L 63/20* (2013.01); *G06F 17/30917* (2013.01)

(58) Field of Classification Search
CPC ....................................................... H04L 63/20
USPC .............................................................. 726/1
See application file for complete search history.

(56) References Cited

U.S. PATENT DOCUMENTS

| | | | |
|---|---|---|---|
| 5,751,967 A | 5/1998 | Raab et al. | |
| 6,170,009 B1* | 1/2001 | Mandal | H04L 41/0893 709/223 |
| 2002/0188870 A1 | 12/2002 | Gong et al. | |
| 2006/0072451 A1* | 4/2006 | Ross | H04L 47/10 370/229 |
| 2009/0205015 A1 | 8/2009 | Baliosian et al. | |
| 2012/0023546 A1 | 1/2012 | Kartha et al. | |
| 2012/0278425 A1* | 11/2012 | Maxted | H04L 63/0281 709/217 |
| 2013/0111540 A1* | 5/2013 | Sabin | G06F 21/554 726/1 |
| 2013/0212061 A1 | 8/2013 | Chitiveli | |
| 2013/0246593 A1 | 9/2013 | Bryskin et al. | |
| 2014/0308942 A1 | 10/2014 | Christopher et al. | |

* cited by examiner

*Primary Examiner* — Jacob Lipman
(74) *Attorney, Agent, or Firm* — Jeffrey S LaBaw; Gail H Zarick; Diana R Gerhardt

(57) ABSTRACT

A method, apparatus and computer program product for automatically reconfiguring a policy of a multi-tenant service is disclosed. A first tenant specific policy for a first tenant of a plurality of tenants serviced by the multi-tenant service is provided. The multi-tenant service uses a second tenant specific policy different from the first tenant specific policy for a second tenant of the plurality of tenants. An event relevant to the first tenant specific policy is detected. The first tenant specific policy is reconfigured according to the detected event.

24 Claims, 7 Drawing Sheets

DYNAMIC DETECTION AND RECONFIGURATION OF A MULTI-TENANT SERVICE

BACKGROUND OF THE INVENTION

Technical Field

This disclosure relates generally to enforcing policy in a network environment. More particularly, it relates to dynamically detecting a network policy in a multi-tenant network environment such as a cloud environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud computing resources are typically housed in large server farms that run network applications, either using a hardware architecture, so-called bare metal cloud hosting, or using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

One or more "containers" can run on a cloud server or VM. A "container" is "lighter" than a VM in terms of using cloud resources. A container is a common deployment model in the cloud; multiple containers run on one virtual machine and one bare metal server can run multiple virtual machines, thus creating a nested structure.

It is known for an organization to arrange computing resources in a hybrid cloud environment, containing both a private cloud in which the computing resources are owned by the organization and provide services only for that organization, and a public cloud in which another organization provides computing services for a plurality of "tenants" including the organization operating the hybrid cloud. One clear benefit of a hybrid cloud model is having on-premises, private infrastructure that is directly accessible, while providing access to the public cloud environment in times of high demand.

The dynamic nature of the cloud computing environment, with the cloud hosting service changing the assignment of tenants to cloud resources, and the changing requests of the tenants for different services and applications within the environment makes it difficult to maintain a security policy for a given tenant or set of tenants.

Therefore, there is a need to improve security in a cloud environment.

BRIEF SUMMARY

According to this disclosure, a method for automatically reconfiguring a policy of a multi-tenant service is disclosed. A first tenant specific policy for a first tenant of a plurality of tenants serviced by the multi-tenant service is provided. The multi-tenant service uses a second tenant specific policy different from the first tenant specific policy for a second tenant of the plurality of tenants. An event relevant to the first tenant specific policy is detected. The first tenant specific policy is reconfigured according to the detected event.

In another aspect of the invention, an apparatus including a processor and a computer memory holding computer program instructions executed by the processor holds instructions for automatically reconfiguring a policy of a multi-tenant service. The computer program instructions include program code operative to provide a first tenant specific policy for a first tenant of a plurality of tenants serviced by the multi-tenant service. The multi-tenant service uses a second tenant specific policy different from the first tenant specific policy for a second tenant of the plurality of tenants. The computer program instructions also include program code operative to detect an event relevant to the first tenant specific policy and program code operative to reconfigure the first tenant specific policy according to the detected event.

In another aspect of the invention, a computer program product in a non-transitory computer readable medium for use in a data processing system is described. The computer program product holds computer program instructions when executed by the data processing system automatically reconfigures a policy of a multi-tenant service. The program code is operative to provide a first tenant specific policy for a first tenant of a plurality of tenants serviced by the multi-tenant service. The multi-tenant service uses a second tenant specific policy different from the first tenant specific policy for a second tenant of the plurality of tenants. The program code is operative to detect an event relevant to the first tenant specific policy. Further, the program code is operative to reconfigure the first tenant specific policy according to the detected event.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

In preferred embodiments of the invention, the system enables a tenant specific policy to be dynamically updated for a cloud provider's service instance for a particular cloud tenant. After mapping or translating a high level tenant policy directive to a tenant specific policy which the service can understand, the system provides the tenant specific policy to the service. The service is a multi-tenant service such as a firewall, intrusion protection system (IPS), or Web Access Control in preferred embodiments of the invention. By dynamically detecting configuration events from shared provider services, tenant applications or containers, the system is able to modify service specific policy elements appropriate to the new service and tenant configuration. The system then deploys a modified tenant specific policy to the appropriate service instance. In preferred embodiments of the invention, the service instance integrates with different cloud specific control protocols. Further in alternate embodiments of the invention, the first policy does not have to be a "high level" policy, but only a policy with a distinct policy structure or schema from the tenant specific policy.

A "high level policy" is a general statement of a manner, i.e. the rules, in which the tenant needs the cloud service to accomplish services for the tenant. For example, a high level policy could be "inspect all my network packets". In many preferred embodiments, the high level policy is relatively static, despite the fact that the cloud environment is very dynamic, and the resources assigned to any single tenant can change quickly. Therefore, which packets belong to a particular tenant change on a dynamic basis.

A "tenant specific policy" is a detailed set of rules of how the cloud service will accomplish services for a particular tenant. For example, a tenant specific policy will include the list of resources assigned to the tenant and how those resources should be configured to implement the high level policy. As compared to the high level policy, the tenant specific policy is dynamic, changing with the changes in the cloud resources assigned to the tenant.

Since the cloud resources assigned to each tenant will be unique, the tenant specific policy for each tenant will be unique with respect to the specific resources for which the policy applies.

A "node" can be any electronic device, client, server, peer, service, application, or other object capable of sending, receiving, or forwarding information over communications channels in a network.

Figure 1:
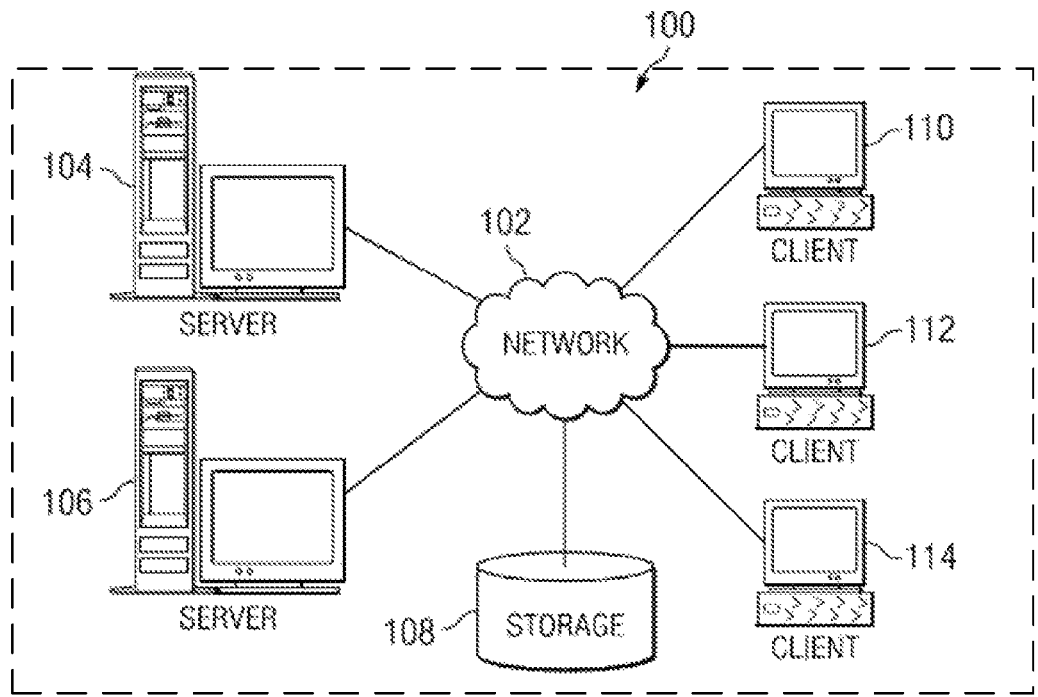
FIG. 1 depicts an exemplary block diagram of a distributed data processing environment in which exemplary aspects of the illustrative embodiments may be implemented.
Figure 2:
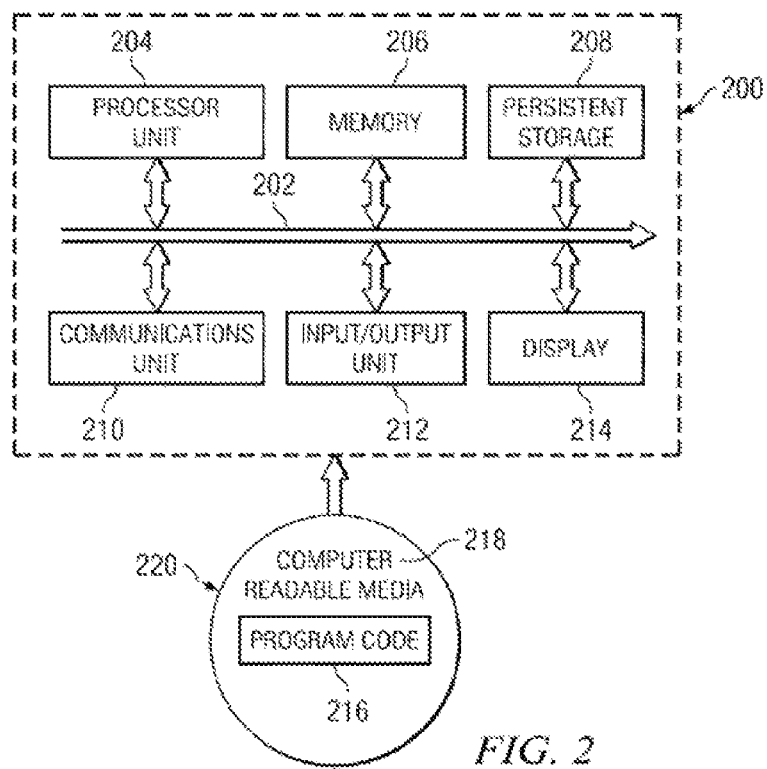
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
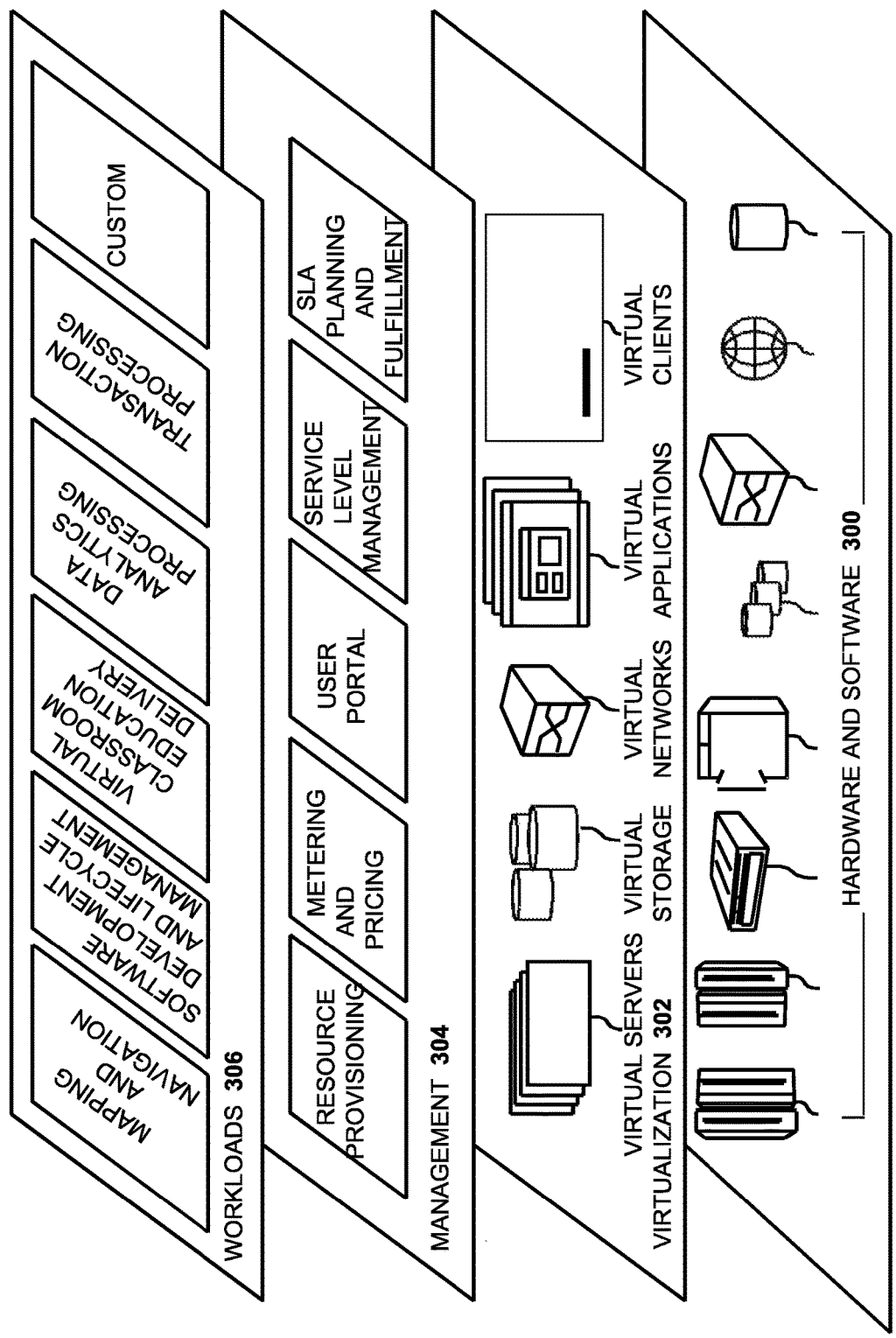
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

In a cloud environment as described above, it is difficult for the cloud service provider to consistently manage shared services for applications where the services have different policies and service configurations for different tenants. The invention detects cloud environment events and other properties, and determines which events are relevant for which tenant specific policies in a multi-tenant environment to allow deployment of the specific policies and reconfiguration of the specific policies. By separating the concerns of the cloud provider and the tenants, the experience for both is improved.

When the cloud provider dynamically assigns tenants to different service instances for purposes of load balancing, meeting new processing demands or meeting service level agreement (SLA) requirements, reconfiguration of the tenant environment occurs. Other events, like tenant application updates or cloud provider scaling activities, can also move the tenant applications to different cloud resources within the cloud environment. Further, the tenants can make requests for additional or different services within the cloud environment or different sets of cloud APIs to use with their applications will also cause changes to the assignment of cloud resources to a given tenant. The frequent reassignment and reconfiguration of tenant environment creates a problem in configuring the tenant specific policies to the cloud provider deployed services which support particular tenant requirements.

The cloud provider may support different tenant container environments. Different tenant container environments require the support and reconfiguration of each service policy based on both on the tenant policy and container type. A cloud "container environment" promotes application portability by encapsulating applications within containers, the containers insulate the application from the underlying cloud platform. However, when a tenant changes from one container environment to another, the cloud resources assigned to the tenant may be changed as well.

The invention provides support for dynamic reconfiguration of cloud resources to respective tenants with dynamic discovery of environment changes and a consequential reconfiguration of a tenant specific policy to the appropriate service instance in a way that can accommodate different provider services and tenant application types.

When a reconfiguration event occurs, either from the cloud provider dynamically deploying or re-assigning services or resources for a particular tenant or from the tenant changing their application environment, service policy reconfiguration is triggered. In one preferred embodiment, the reconfiguration event can be identified by monitoring control protocols a of a container environment. Examples of control protocols in container environment include, but are not limited to, CloudFoundry messages over RabbitMQ or restful Web messages in a Zookeeper Environment. In other cloud environments, other protocols can be monitored for changes to the cloud resources assigned to a specific tenant. In an alternative embodiment, a cloud environment supports a service which can be queried periodically for a current set of cloud resources assigned to a particular tenant. When the current set of resources does not match a last saved set of resources, and the difference is meaningful from a tenant policy perspective, a reconfiguration event has occurred. In response to a reconfiguration event, the invention uses the high level tenant policy to dynamically reconfigure a current specific tenant policy which is used by service endpoints. In other embodiments of the invention, the cloud provider actively interrupts the service about the changes in the cloud resources. As is mentioned elsewhere, the cloud reconfiguration events include change of cloud resources assigned to the first tenant such as adding, dropping or changing machines, a change in cloud service parameters relevant to the first tenant or a requested change to the tenant environment by the first tenant.

In one embodiment of the invention, the mappings for the tenants, the cloud services the respective tenants use, the high level policies for each of the cloud services the respective tenants use and other tenant related cloud application parameters are kept in a registry or other database. For the initial or subsequent configurations, the high level configuration policy for an appropriate set of tenants can be retrieved from the registry. As will be discussed below, in a reconfiguration step, the high level configuration policy can be useful if the translating layer does not understand does not fully understand the context of a delta change in cloud resources as it might affect the tenant specific policy.

Changes to the cloud configuration are monitored by the cloud provider or by the service provider. The changes can be detected by monitoring a cloud control API, by queries to a tenant cloud resource database or the cloud provider actively notifying the service provider as the changes occur. An example of active notification is the Cloud Foundry Callback mechanism (CFCB). CFCB is one embodiment of the active approach that it is Cloud Foundry which actively notifies services via the callback the service registered. The service provider would register for events relevant to the clients which it services. Active notification can be used to notify the service provider prior to the actual changes to the cloud resources. This allows the service provider to prepare for the changes. Further, the cloud provider and the service can interact in a synchronous way. For example, the cloud provider can wait for an acknowledgement from the service provider before it executes a cloud resource change such as adding a new VM. In preferred embodiments, the multi-tenant cloud service is a network policy enforcement point such as a firewall or intrusion protection system (IPS). In cases where the service provider delivers one or more enforcement points, the active notification is a preferred embodiment as it provides improved security; no delay occurs between the cloud resource change and service adaptation to the new cloud configuration. In the case of a polling interval, a gap in time could occur between the cloud resource change and when the change is detected. In response to a detected change in a relevant parameter, the tenant specific policy for the multi-tenant cloud service is dynamically reconfigured.

Based on the detected change, the tenant specific policy is reconfigured. For a network policy enforcement point, the tenant specific policy would be an enforcement policy. In some cases, the translation layer may be able to reconfigure the tenant specific policy using only the detected change information. In other cases, the high level policy could be used as a reference because the cloud provider might only provide the delta information between the state of current resource and the previous state and the translation layer may not have enough context to reconfigure the existing tenant specific policy to a new tenant specific policy based on the delta alone. Further, although the invention is discussed herein a translates a general, high level policy to the tenant specific policy, the original policy may be a detailed policy similar in detail level to the tenant specific policy but using a different format or schema than understood by the service provider endpoint. As changes to the cloud environment are detected by the cloud or service providers, the tenant specific policy is reconfigured.

As is mentioned above, the cloud environment dynamically (or in response to administrator actions) configures and assigns the tenants, their users, applications and services to available cloud resources. Embodiments of the invention provide for dynamic reconfiguration of a standard enforcement point (or other multi-tenant services) to adapt to such changes in the cloud tenant based configurations. In embodiments of the invention, the cloud provider service has a tenant aware enforcement point for a particular tenant. In those embodiments, the tenant aware enforcement point manages tenant specific policies for that tenant. Such tenant specific policies include network access policies, endpoint categorization policies, endpoint reputation policies, quality of service (QOS) policies and so forth. In embodiments of the invention, each tenant specific policy will be updated according to cloud environment changes in view of a high level policy of the same type.

In one preferred embodiment, an Integration Administration module is the translation layer which contains the mappings between cloud host and technical enforcement parameters such as IP address and other parameters used in the tenant specific policies used by the cloud services. In preferred embodiments of the invention, the Integration Administration component is a tenant aware component.

In preferred embodiments of the invention, the high level policy is a machine readable policy which is kept in the registry. The configuration policy can be expressed as a data schema. One example of a schema would be an XML schema, though the policy could be in any appropriate format understood by the translation layer. Further, there is a mechanism which allows a cloud service such as a tenant aware enforcement point to either query for changes or to be notified of changes, e.g., on a subscription basis, in the cloud environment which are pertinent to a supported tenant specific policy. The high level configuration policy can be expressed and enforced on a tenant, a network or an administrator user basis. For example, the high level policy for a tenant can be expressed in terms of the tenant or of other tenants of the cloud: "scan all of my packets", "scan all packets originating from tenant X". As another example, the high level policy can be expressed in terms of a network: "scan all packets originating from the Internet", "scan all packet originating from company A's internal network". Or the policy can be expressed in terms of a user in combination with other parameters: "scan all packets from user X when they use service A on network Q".

Figure 4:
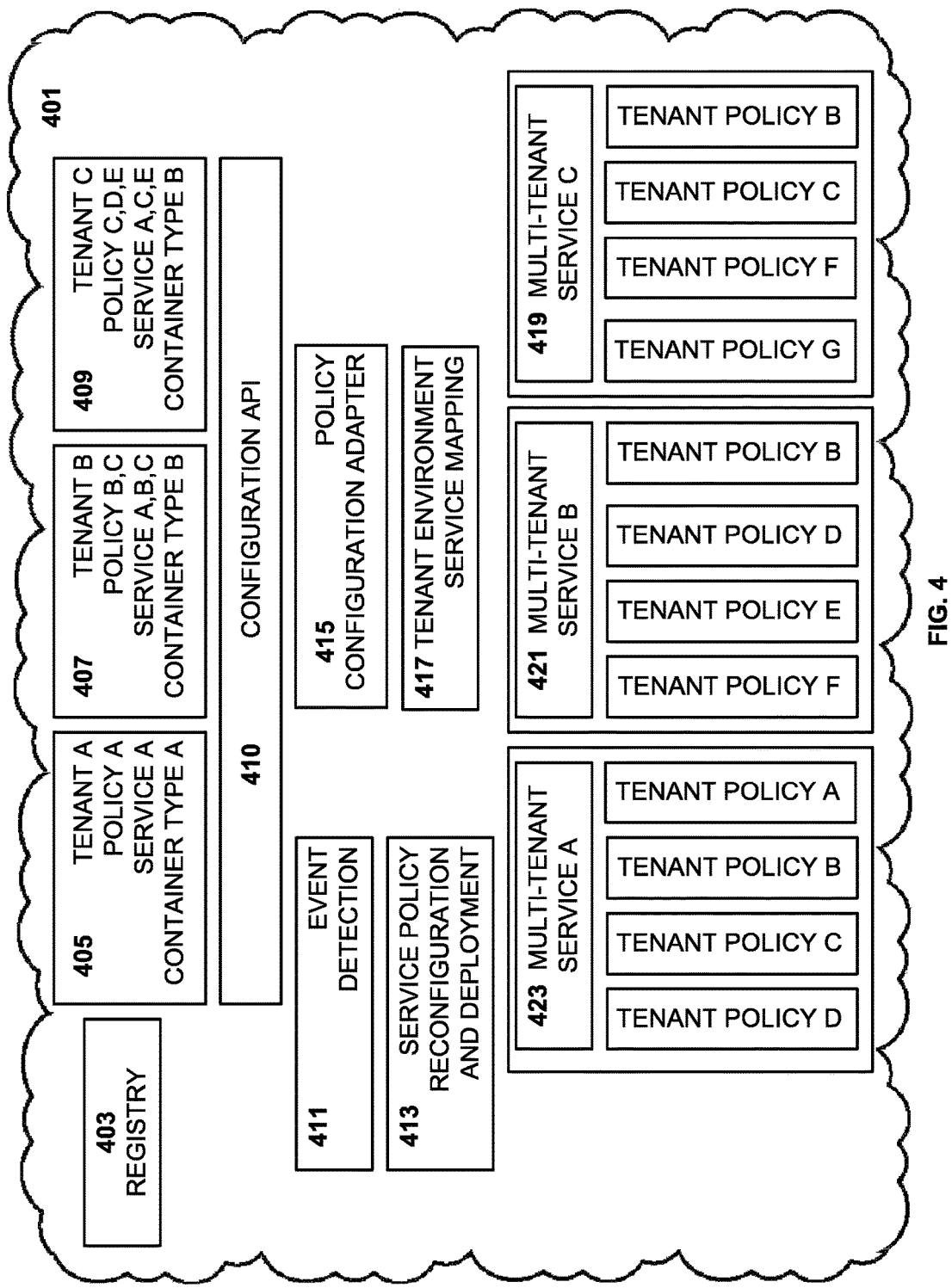
FIG. 4 is an architectural diagram of a preferred embodiment of the invention.

FIG. 4 is an architectural diagram of a preferred embodiment of the invention. As shown, cloud environment 401 includes a registry 403 which contains information about a plurality of tenants 405, 407, 409 such as high level policies, services to which the high level policies pertain and the container types or other data about the cloud environment used by the tenant. The registry 403 also contains mappings of tenant, policy, and provider configuration data. For example, the registry 403 would contain a mapping 405 that for tenant A, policy A is used for service A and tenant A uses container type A, while the mapping 407 for tenant B uses policy C for service D and uses container type B. In the embodiment, the high level configuration policy obtained from the registry is translated into a format which the enforcement point understands with the needed cloud resource details. Although three tenants are depicted for ease in illustration, those skilled in the art would recognize that many more tenants would be serviced by the cloud environment 401 in most cloud implementations.

The cloud environment 401 also includes cloud configuration API 410. The API layer 410 can allow "container-based" applications, VM based applications or even bare metal cloud implementations to interact with the tenant, or a combination thereof. A "container" is a convenient way to package a cloud application with all of its dependencies into a standardized unit for software development.

An event detection engine 411 detects changes in the configuration of the cloud environment due to tenant or administrator requests. Changes in the assignment of cloud resources can be detected by monitoring a cloud control API. Alternatively, the data can be stored in tenant cloud database by the cloud provider. Queries to the tenant cloud resource database can be made and the current cloud resource data retrieved for a tenant can be compared to a previously stored set of data. In one preferred embodiment, the tenant cloud resource database contains the changes and status of the cloud resources in the cloud environment for the tenants. In some embodiments, the tenant cloud resource database is part of the registry 403. In cases that the cloud provider actively notifies the service provider, the event detection engine 411 is part of the cloud provider infrastructure and is coupled with a notification module.

Service providers in the cloud can register to be notified for events relevant to a supported tenant specific policy or high level tenant policy. Typically, these events will include changes to the tenant assigned resources whether the set of tenant resources are added, dropped or changed. The events can be specific to a subset of tenant resources which the service provider is supporting. Further, the events can be relevant to elements of a policy. For example, if tenant A had a policy that all network packets from service B on network C are to be inspected, the supporting service would likely subscribe to events concerning tenant A, service B and network C. In one embodiment of the invention, the event detection engine can evaluate the policies in the registry 403 together with the mapping to the service provider to derive a list of events relevant to the high level policy that the service provider will be interested in as a subscriber.

In the embodiment shown in FIG. 4, the Integration Administration component is divided into the service policy reconfiguration and deployment component 413 and the policy configuration adapter 415. The policy configuration adapter 415 maps or translates the high level tenant policy to a tenant specific or service specific policy. In response to a detected change or change notification, the service policy reconfiguration and deployment component 413 initiates a reconfiguration of an existing high level policy or existing tenant specific policy to a new tenant specific policy. The service policy reconfiguration component 413 uses the policy configuration adapter 415 for the actual translation. In embodiments of the invention, multiple policy configuration adapters can be used, each for a different tenant or tenant protocol. In yet other embodiments of the invention, these components 413, 415 could be merged.

The tenant environment service mapping component 417 provides a lookup function for a tenant to find a service to which it is subscribed. For example, if a tenant subscribes to a database service, the tenant environment service mapping component 417 can provide the IP address of the database server which is currently servicing its requests.

Also depicted are a plurality of multi-tenant environment/ service mapping facilities 419, 421, 423. Each of the facilities is a portal to a multi-tenant service. The service mapping facilities 419, 421, 423 receive the tenant specific policies appropriate to its tenants from the service policy reconfiguration and deployment component 413 and the policy configuration adapter 415. Reviewing registry data for Tenant A 405, it can be seen that there is a high level policy (Policy A) for Service A. Multi-tenant environment/service mapping facility 423 includes a tenant specific policy (Tenant Policy A) for Tenant A. Similarly reviewing registry data for Tenant B 407, it can be seen that there are a high level policies (Policy B and Policy C) for Services A, B and C. Each of multi-tenant environment/service mapping facilities 419, 421, 423 includes a tenant specific policy (Tenant Policy B) for Tenant B.

Also shown in registry data 405, 407, 409 is container type information for each tenant. However, a container is just one type of cloud installation which the invention can support. Configuration changes between different tenant cloud environments offered by the cloud provider, e.g., CloudFoundry, Docker, Heroku, or Hypervisors like XEN, KVM, VMware will result in different cloud resources being allocated to the tenant, and therefore, changes to the tenant specific policies sent to the multi-tenant cloud service providers.

Although certain functional modules are shown in the figure, those skilled in the art will appreciate that in other embodiments of the invention, other translation layers receive the information from the registry and modify it into a format which the policy enforcement point understands. Further, while only three mapping services are shown, those skilled in the art would realize that a typical cloud environment 401 can support many more services and is only limited by the computing resources devoted to the cloud environment.

Figure 5:
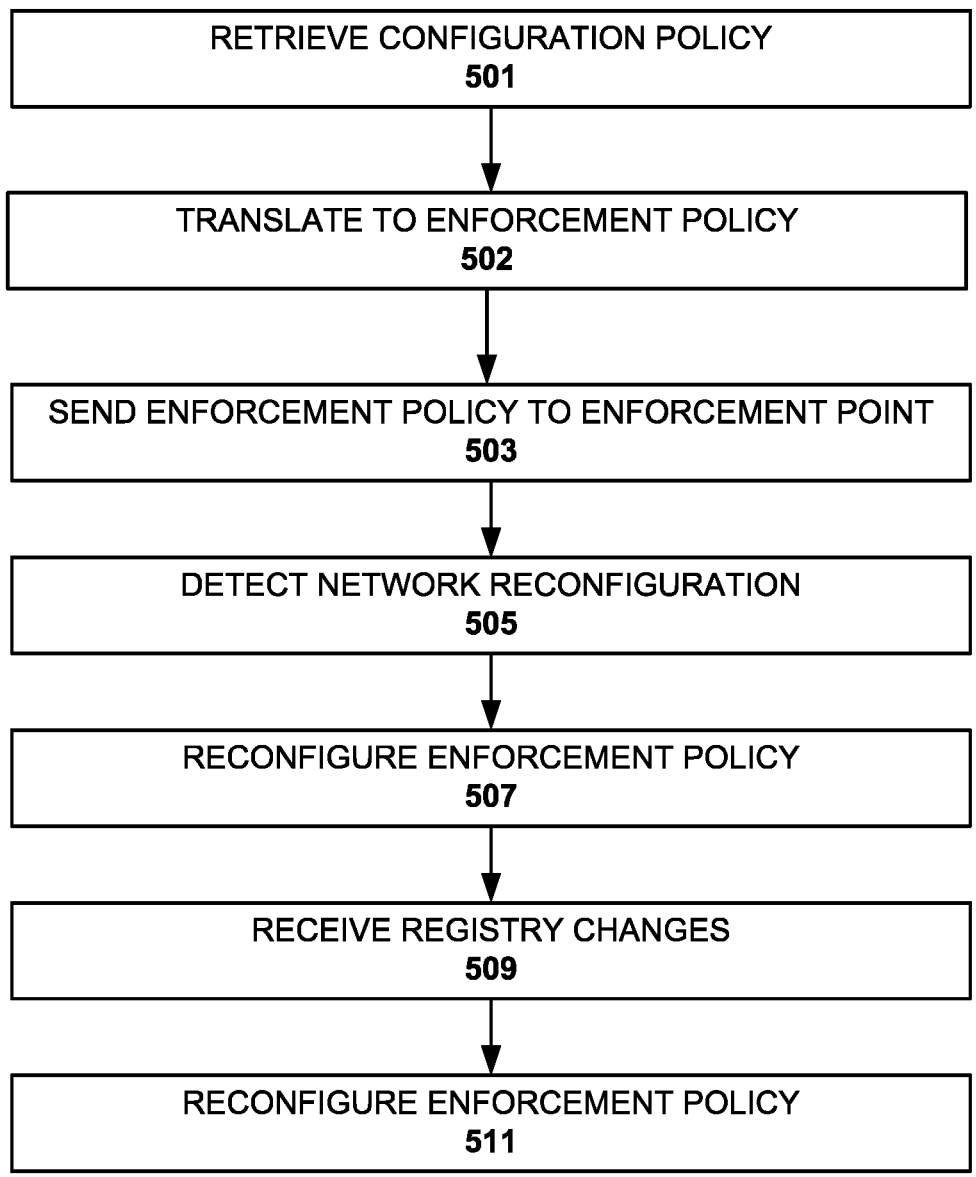
FIG. 5 is a high level flow diagram of reconfiguring a tenant specific policy according to an embodiment of the invention can be implemented.

FIG. 5 is a high level flow diagram of reconfiguring a tenant specific policy according to an embodiment of the invention can be implemented. A configuration policy is loaded in the registry by a prior step with a tenant or administrator request. In the drawing, the general process begins with step 501, where the high level configuration policy is retrieved from the registry 403 in response to a cloud reconfiguration event such as the initial installation of a tenant application on a first system in the cloud environment. The configuration policy is sent to the Integration Administration component which translates it to a tenant specific policy, e.g., an enforcement policy, step 502. The enforcement policy is sent to a cloud service, such as an enforcement point, e.g., IPS, Firewall, which provides services to the tenant application, in step 503. Next, a cloud reconfiguration event is detected, step 505, either from a query or a subscription to network reconfiguration events, for example, by the event detection engine 411. In one embodiment, the event is a move of the tenant application to a second system.

In step 507, the tenant specific policy on the enforcement point is reconfigured to agree with the new network configuration for the tenant application to produce a new tenant specific policy. That is, the high level configuration policy is specialized to the new specific machines or virtual machines on which the tenant application is resident. In step 507, the component receiving the new network configuration recognizes which high level configuration policy is affected by the new configuration to be able to modify the set of tenant specific policies. Embodiments of the invention also reconfigure the tenant specific policy in response to changes in the registry. Changes to the registry information can indicate tenant initiated changes or requests. The change to the registry information may include a new high level configuration policy requested by the tenant. In response to receiving a change in configuration policy information in the registry pertaining a tenant (step 509), the new configuration policy is forwarded to the Integration Administration component which translates it to a tenant specific policy, and then forwards the new tenant specific policy to the enforcement point, step 511.

Figure 6:
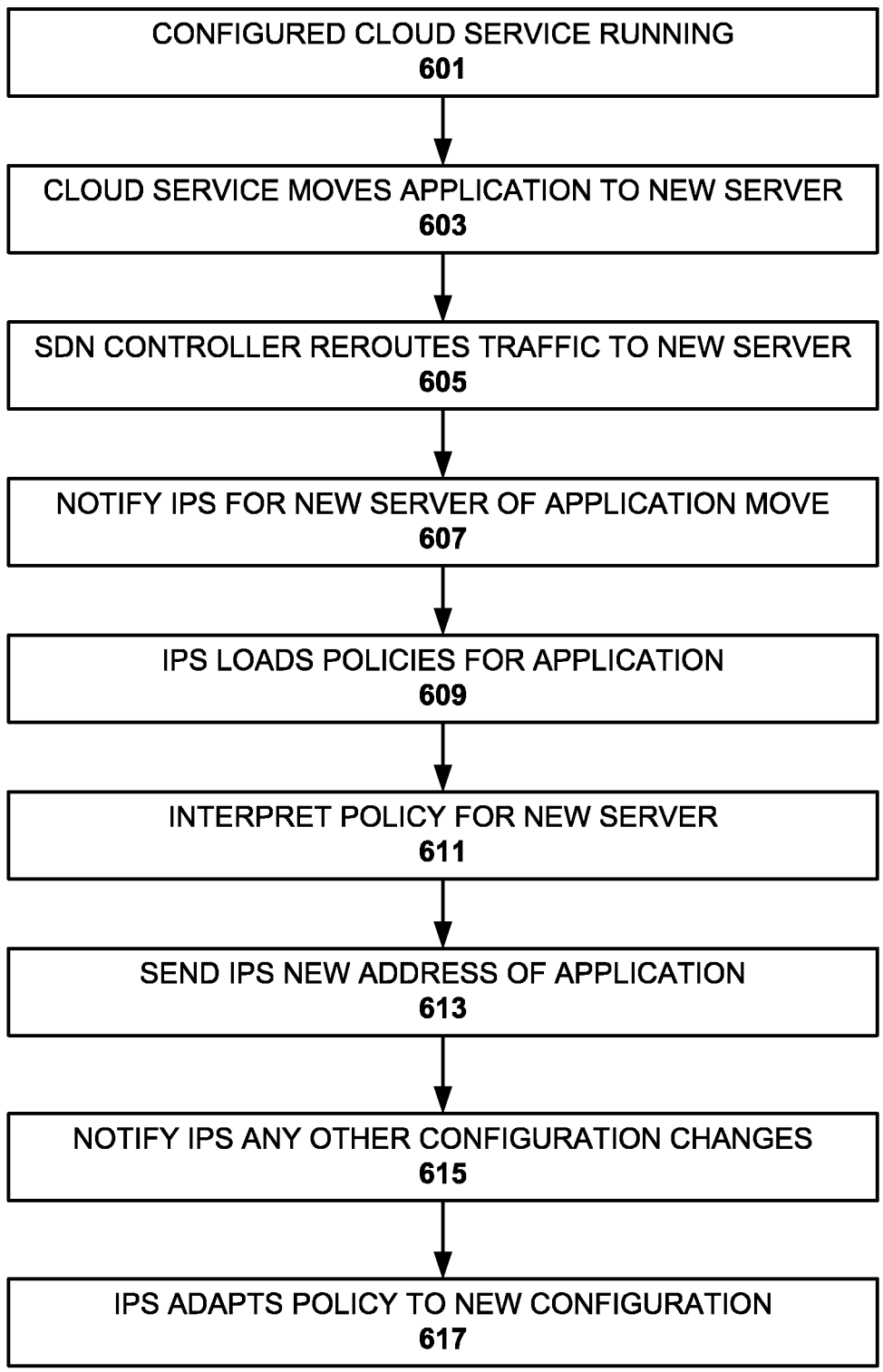
FIG. 6 is a flow diagram of reconfiguring an IPS according to an embodiment of the invention.

FIG. 6 is a flow diagram of reconfiguring an IPS according to an embodiment of the invention.

In this embodiment of the invention, a service provider deploys a multi-tenant enabled network control device, like an intrusion prevention system (IPS) that is shared across multiple tenants. In response to a detected reconfiguration of the cloud environment, the invention identifies specific IP Addresses, Sources and Destinations for packets for which specific inspection and action policies may be applied for the IPS service.

In the embodiment, Client A is using a cloud provider's services, step 601, in a configured tenant application. In the cloud provider services, there are many servers which can run applications and each server has an intrusion protection system (IPS) protecting the system. An IPS can be shared among several servers. In this example, there are two servers, Server A and Server B, and IPS-A and IPS-B respectively protect Server A and Server B, and Client A's application is called Application C.

Client A has subscribed to an IPS service for Application C to make sure it can run safely in the cloud provider's services. By default, Application C is running on Server A, so it is protected by IPS-A. In step 603, the cloud provider decides to move Application C to Server B for load balancing, so it migrates the Application C and asks the software defined network (SDN) controller to re-route the traffic for Application C from Server A to Server B, step 605.

When the SDN controller receives this command, step 607, it notifies IPS-B to load the policies for Application C, so that IPS-B is ready to serve this new application before Application C is migrated to Server B, step 609. Next, the cloud provider's services assigns a new private IP address to Application C.

However, in the high level security policy for Application C, the policy simply states that "Full inspection to Application C be performed". In step 611, the embodiment interprets and modifies the high level policy to provide tenant specific policies for the new server, Server B. The IPS-B needs to know the IP address of Application C, so that it can perform inspection of the network packets containing this IP address, 613. The system then notifies IPS-B about any other configuration changes in its environment, step 615. In one preferred embodiment of the invention, once IPS-B receives the notification, IPS-B itself translates the high level policy to update the application-to-IP address mapping in the tenant specific policy, step 617. That is, the enforcement point is tenant aware and performs the policy translation tasks. In alternative embodiments of the invention, a mapping layer such as the Integration Administration component described above performs the policy translation process.

There are many situations in which the cloud platform needs to notify the IPS or another entity doing policy enforcement. For example, if the policy says "Protect all applications owned by Client R", then whenever Client R adds, removes or moves an application, the system updates the cloud resource assignments behind the policy and makes any needed changes to the tenant specific policies of the policy enforcement points.

As another example, a service provider may have a high level policy for all the tenants of another service provider. In the cloud, service provider R owns virtual machines (VMs) as the database servers and service provider J own VMs as the web servers. Service provider J's VMs face the Internet directly while service provider R's VMs only serve the VMs running locally. Both service provider J and service provider R provide services within the overall cloud and users of service provider J request database services from service provider R. Because service provider J's tenant users come from the Internet, service provider R is concerned about a possible threat to his databases. Service provider C provides a network protection service to subscribing tenant service providers within the cloud. Service provider R subscribes to service provider C's network protection service, and sends a single policy, that is, "all the traffic sent from tenant service provider J's VMs to my VMs must be inspected".

Figure 7:
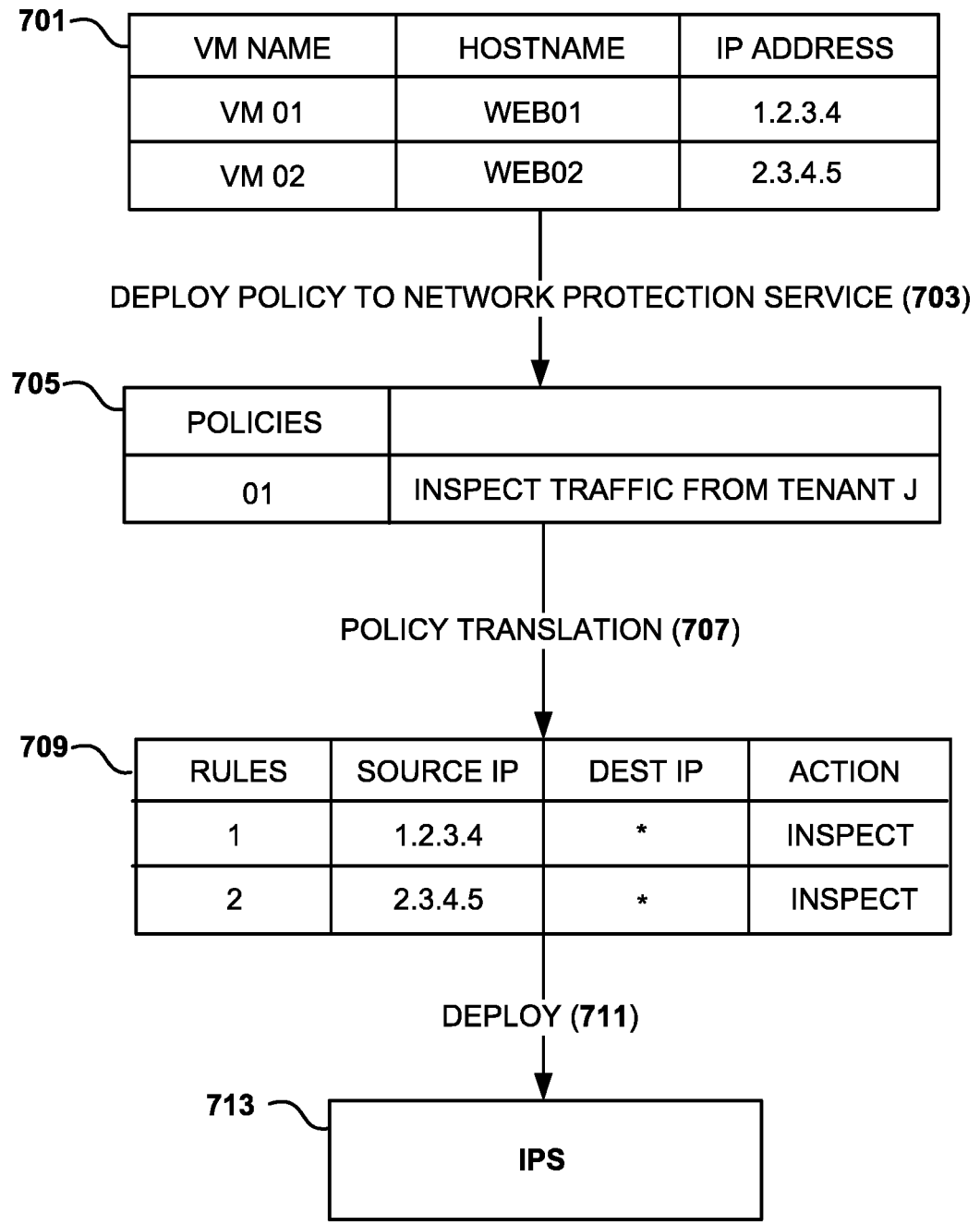
FIG. 7 is a diagram showing the translation of a high level policy to a tenant specific policy in one preferred embodiment of the invention.

Referring now to FIG. 7, the registry (or other cloud provider database) keeps a list 701 of service provider J's VMs, including the VM name, hostname and IP address. In message 703, service provider R's high level policy is received by service provider C. At the service side of provider C, although the policy may be understood, the packets sent from service provider J's tenant do not have a special signature. Typically, in the network layer, it is possible to identify the origin of packets using plurality of attributes, including, but not limited to, IP address and cookies in a HTTP protocol. So the policies of provider C's network protection service are set up according to the packet attributes rather than according to a tenant.

Embodiments of the invention are used to obtain a mapping of packets from service provider J's users, those named in the high level policy, to a tenant specific policy containing a list of IP addresses (or other attributes) that can be fed to IPS engine. In embodiments discussed above, the mapping or translation is done in the policy configuration adapter 415. In other embodiments discussed above, the translation of a high level policy to a tenant specific one can be accomplished in a translation layer of a tenant aware IPS. Returning to FIG. 7, the high level policy is received by the component which performs the translation, box 705, and performs the translation in step 707. The tenant specific policies shown in box 709, include a rule for each of provider J's VMs which is an example of a high level policy being translated into a plurality of tenant specific policies. In this example, the "tenant specific policies" are specific to a service provider in view of another service provider rather than a specific policy for a particular tenant of provider J. These policies are sent 711 to the IPS 713 so that all of the packets from provider J's VMs can be inspected. In the example, the rule says inspect all traffic from provider J, but did not specify the destination. If the rule specify the destination then a destination IP would also be provided. The present invention enables the translation which cannot currently be performed automatically by the prior art.

Figure 8:
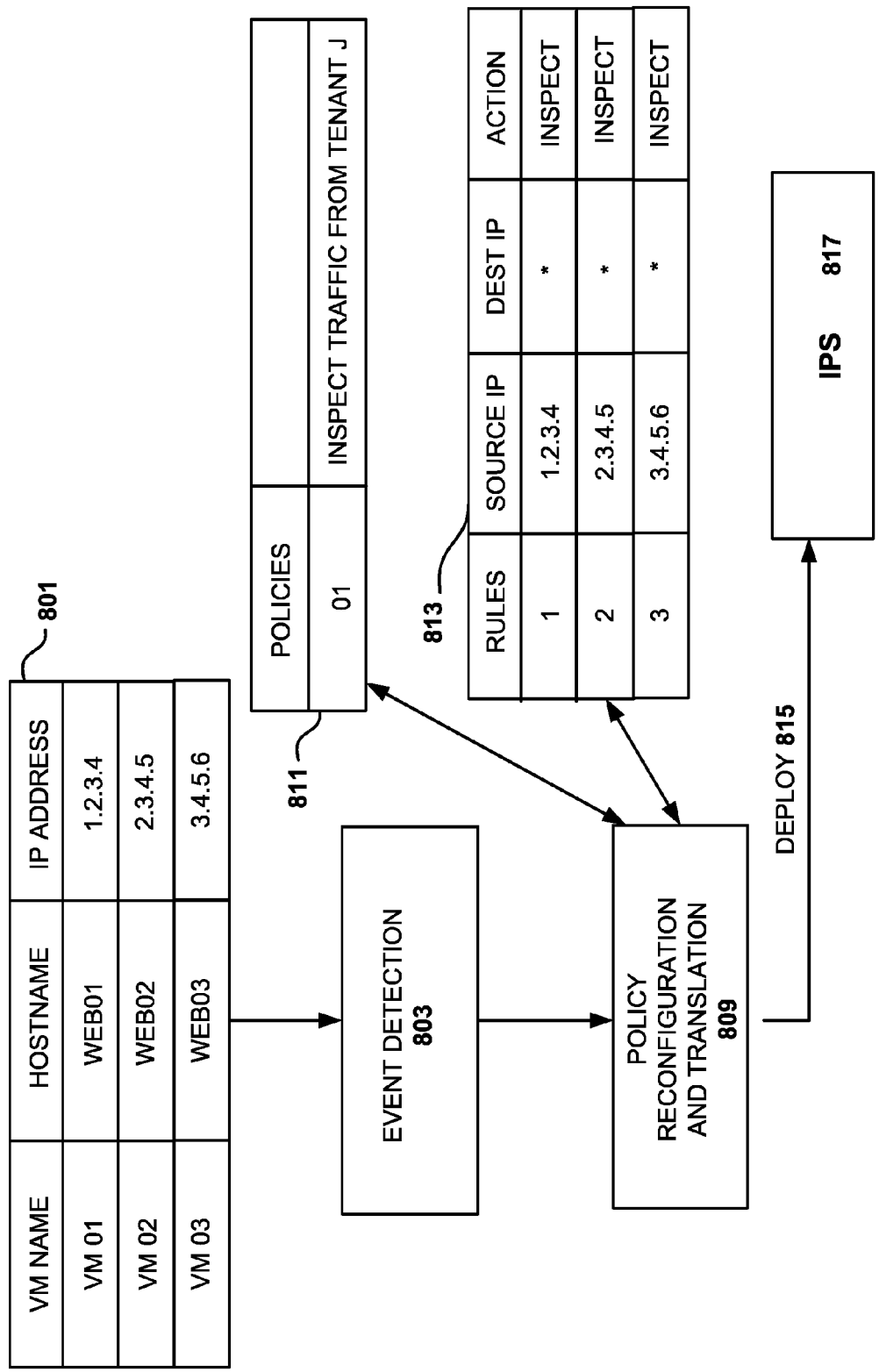
FIG. 8 is a diagram showing the reconfiguration of a tenant specific policy in view of a high level policy in response to a change in assignment of cloud resources to respective tenants in one embodiment of the invention.

Continuing this example in FIG. 8, when service provider J's business expands, more VMs are ordered from the cloud provider to serve the new customers of service provider J. Because of the expansion, both service provider R and service provider C need to account for the change, i.e. the network traffic from service provider J's new VMs is identified. As shown, VM 03, has been added to the list 801 of provider J's VMs. In event detection 803, the added VMs are detected either by the cloud provider or service provider monitoring cloud control messages or databases. In preferred embodiments of the invention, the cloud platform notifies interested parties about the expansion, by means of the event detection component 411. When service provider C receives this notification from the cloud provider, he needs to be able to change the high level policy in view of the new IP list to produce a new set of tenant specific policies to the IPS engine. The new IP list, and therefore, the set of tenant specific policies, should contain all the new VMs which are allocated to service provider J's tenant. In preferred embodiments, the policy reconfiguration and translation step 809 is done by service policy reconfiguration and deployment (SPRD) component 413 and policy configuration adapter (PCA) 415. In response to the event, the SPRD component 413 determines that policy reconfiguration should occur and requests that PCA 415 reconfigure the tenant specific policies (re-construct the IP list) then deploys the new tenant specific policies to the IPS engine. If needed, the PCA 415 will reference service provider R's high level policy 811 to produce the new tenant specific policies 813. In other embodiments of the invention where a tenant aware IPS is used, the translation of the high level policy in view of the network changes is performed by the translation layer in the IPS. The new set of policies are shown in box 813, showing a new rule 3 for the new VM 03. These policies are deployed 815 by the SPRD component 413 to the IPS 817 so that all of the packets from provider J's VMs can be inspected. In this way, a service provider can expand for new customers, yet existing service providers can enforce a high level security policy to service their own services and enforcement points can be kept to date on cloud topology changes.

Embodiments of the invention could apply to many services offered in the cloud. As long as the asset in the cloud is not static, all the services need to adapt to the changes in assets assigned to their tenants. Another example of a cloud service is an API monitoring service. Service providers use API monitoring to charge their users. For example, 1000 DB queries could cost $1. If the high level policy says: "all the DB queries sent from tenant J get a 50% discount", the API monitoring service needs to know which IP addresses belong to tenant J. In an initial configuration, it might be possible to obtain an IP list from the tenant J, however, as tenant J adds and removes new VMs, the IP address list needs to be updated and it becomes an increasing burden on tenant J to dynamically supply such information. In embodiments of the present invention, the processing flow will have the following steps: 1) translate the high level policy to a set of tenant specific policies, 2) notify the service of an event, 3) the service (if tenant aware, or else request an integration administration service) to reconfigure its tenant specific policies and 4) deploy the new tenant specific policies to the service.

In certain embodiments, a "smart", "tenant aware" IPS or other policy enforcement point includes a translation layer that can receive network event information on the changes in the cloud environment and translate the general high level policy into the tenant specific policy that the enforcement point needs.

An SDN is one tool that embodiments of the invention can leverage to receive notifications in cloud platform. For example, when there is a new network flow shows up on SDN switch, the service portal will be notified and update its tenant specific policies.

The present invention has many advantages over the prior art. As compared to an on-premise datacenter, a cloud is an extremely dynamic environment. Multiple providers, versatile platforms and heterogeneous workload make it very difficult to keep track of which tenants are assigned to which assets in the cloud. This dynamic nature makes it very difficult to continually update policies for managing a tenant's or a service provider's assets in the cloud. Embodiment of the invention provide a system work flow use a high level profile to dynamically update the tenant specific policies in the cloud. For example, it is not feasible to use an IP address list to define a tenant's assets in the cloud. For administration, it will be easier if administrator uses the tenant's or service provider's name to define the assets. Rather than maintaining a complicated asset list, instead, the invention allows an administrator to use a simple high level policy, which can be implemented in a user interface with a simple check box for enabling the high level policy.

When administrator defines their policies from a high level perspective, the invention helps services automatically adapt to the high level policy by dynamically changing the tenant specific policy. By allowing a tenant user or a service provider user to define their policies from a high level perspective in the cloud, the invention fulfills a need in the cloud as neither users or service providers have full control to their assets. Cloud asset assignments move between server racks and scale at runtime dynamically.

The invention provides comprehensive policy enforcement of dynamically changing assets. From service provider's point of view, in the prior art, the latest asset status is not obtained in realtime. In the invention, by having the cloud provider update the registry or an event service which monitors the cloud control APIs, a mechanism is provided to notify the service providers of a change which requires an update to the tenant specific policies. By having a robust notification system in place, the chance that packets might be missed by an enforcement point is reduced.

Platform integration in the cloud becomes easier. It is never easy to migrate an existing application to a cloud environment. However, the present invention provides a good framework for inserting a new service in the cloud. With a proper notification system and an interface to obtain asset information from the cloud environment, the product itself does not need to understand every detail in the cloud environment as long as there is a policy translation module translating the high level policies to a tenant specific policy format which application understands.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method for automatically reconfiguring policies of a multi-tenant service operating in a cloud environment and servicing a plurality of tenants comprising:
   translating a first high level policy for services for a first tenant to a first tenant specific policy usable by the multi-tenant service to service resources assigned to the first tenant, wherein the first high level policy is a member of a plurality of high level policies which includes a second high level policy for a second tenant and each high level policy of the plurality of high level policies is a general set of rules to service cloud resources in the cloud environment of a respective tenant, wherein the first high level policy includes a rule for an action to be applied to members of a type of network entity affecting the cloud resources assigned to the first tenant and the first tenant specific policy is a detailed set of rules to service cloud resources including a current list of cloud resources assigned to service the first tenant, wherein the translating enables the first tenant specific policy to identify specific ones of the network entity;
   providing the first tenant specific policy for the first tenant;
   detecting an event relevant to the first tenant specific policy; and
   reconfiguring the first tenant specific policy according to the detected event.

2. The method as recited in claim 1, further comprising:
   providing a database for mapping respective tenant specific policies to multi-tenant services;
   monitoring the database for changes;
   responsive to detecting a database change indicating an event relevant to the first tenant specific policy; and
   reconfiguring the first tenant specific policy by translating the first high level policy to the first tenant specific policy according to the database change.

3. The method as recited in claim 1, wherein the multi-tenant service is an enforcement point in a cloud environment which services a plurality of tenants, wherein the enforcement point is selected from a group consisting of a firewall or an intrusion protection system.

4. The method as recited in claim 1, wherein the multi-tenant service operates in a cloud environment, wherein the event is a cloud reconfiguration event selected from the group consisting of a change of cloud resources assigned to the first tenant, a change in cloud service parameters relevant to the first tenant or a requested change to the tenant environment by the first tenant.

5. The method as recited in claim 1, wherein the first high level policy includes a rule for a scanning action to be applied to all network packets from cloud resources assigned to the first tenant.

6. The method as recited in claim 1, wherein the first high level policy includes a rule for a scanning action to be applied to all network packets from cloud resources assigned to a second tenant to cloud resources assigned to the first tenant.

7. The method as recited in claim 1, wherein the first high level policy includes a rule for a scanning action to be applied to all network packets from a first network to cloud resources assigned to the first tenant.

8. The method as recited in claim 1, wherein the first high level policy includes a rule for a scanning action to be applied to all network packets from a first network by a second tenant to cloud resources assigned to the first tenant.

9. The method as recited in claim 1, and the first high level policy includes a rule for all members of a type of a plurality of cloud resources currently assigned to a tenant and the reconfiguring the first tenant specific policy changes to which ones of the plurality of cloud resources the first tenant specific policy applies, wherein the detected event does not change the first high level policy.

10. The method as recited in claim 9, wherein the first high level policy is static compared to the first tenant specific policy which dynamically changes with events relating to cloud resources assigned to the first tenant.

11. The method as recited in claim 9, the method further comprising:
translating the second high level policy to the second tenant specific policy usable by the multi-tenant service to service resources assigned to the second tenant, wherein the second high level policy is a general set of rules to service resources assigned to the second tenant, wherein the second high level policy includes a rule for an action to be applied to members of a type of network entity affecting the cloud resources assigned to the second tenant and the second tenant specific policy is a detailed set of rules to service resources including a current list of resources assigned to the second tenant, wherein the translating enables the second tenant specific policy to identify specific ones of the type of network entity; and
sending the first tenant specific policy to a first enforcement point assigned to the first tenant and the second tenant specific policy to a second enforcement point assigned to the second tenant.

12. The method as recited in claim 11, wherein the first high level policy is selected from a group of a policy which applies to any of the cloud resource assigned to the first tenant and a policy which applies to communications from any of the cloud resources assigned to the second tenant.

13. Apparatus, comprising:
a processor;
computer memory holding computer program instructions executed by the processor for automatically reconfiguring policies of a multi-tenant service operating in a cloud environment and servicing a plurality of tenants, the computer program instructions comprising:
program code, operative to translate a first high level policy for services for a first tenant to a first tenant specific policy usable by the multi-tenant service to service resources assigned to the first tenant, wherein the first high level policy is a general set of rules to service cloud resources assigned to the first tenant, wherein the first high level policy is a member of a plurality of high level policies which includes a second high level policy for a second tenant and each high level policy of the plurality of high level policies is a general set of rules to service cloud resources in the cloud environment of a respective tenant, wherein the first high level policy includes a rule for an action to be applied to members of a type of network entity affecting the cloud resources assigned to the first tenant and the first tenant specific policy is a detailed set of rules to service cloud resources including a current list of resources assigned to service the first tenant, wherein the translating enables the first tenant specific policy to identify specific ones of the network entity;
program code, operative to provide a first tenant specific policy for a first tenant of a plurality of tenants serviced by the multi-tenant service;
program code, operative to detect an event relevant to the first tenant specific policy; and
program code, operative to reconfigure the first tenant specific policy according to the detected event.

14. The apparatus as recited in claim 13, wherein the computer program instructions further comprise:
program code operative to provide a database for mapping respective tenant specific policies to multi-tenant services;
program code operative to monitor the database for changes;
program code operative to indicate an event relevant to the rst tenant specific policy; and
program code operative to reconfigure the first tenant specific policy according to the database change.

15. The apparatus as recited in claim 13, the first high level policy includes a rule for all members of a type of a plurality of cloud resources currently assigned to the first tenant and the reconfiguring the first tenant specific policy changes to which ones of the plurality of cloud resources the first tenant specific policy applies, wherein the detected event does not change the first high level policy.

16. The apparatus as recited in claim 15, wherein the first high level policy is static compared to the first tenant specific policy which dynamically changes with events relating to cloud resources assigned to the first tenant.

17. The apparatus as recited in claim 15, the computer program instructions further comprising:
program code operative to translate the second high level policy to the second tenant specific policy usable by the multi-tenant service to service resources assigned to the second tenant, wherein the second high level policy is a general set of rules to service resources assigned to the second tenant, wherein the second high level policy includes a rule for an action to be applied to members of a type of network entity affecting the cloud resources assigned to the second tenant and the second tenant specific policy is a detailed set of rules to service resources including a current list of resources assigned to the second tenant, wherein the translating enables the second tenant specific policy to identify specific ones of the type of network entity; and
program code operative to send the first tenant specific policy to a first enforcement point assigned to the first tenant and the second tenant specific policy to a second enforcement point assigned to the second tenant.

18. The apparatus as recited in claim 17, wherein the first high level policy is a policy which applies to any of the cloud resources assigned to the first tenant and the second high level policy is a policy which applies to communications from any of the cloud resources assigned to the second tenant.

19. A computer program product in a non-transitory computer readable medium for use in a data processing system, the computer program product holding computer program instructions executed by the data processing system for automatically reconfiguring a policy of a multi-tenant service operating in a cloud environment and servicing a plurality of tenants, the computer program instructions comprising:
program code, operative to translate a first high level policy for services for a first tenant to a first tenant specific policy usable by the multi-tenant service to service resources assigned to the first tenant, wherein the first high level policy is a general set of rules to service cloud resources assigned to the first tenant, wherein the first high level policy is a member of a plurality of high level policies which includes a second high level policy for a second tenant and each high level policy of the plurality of high level policies is a general set of rules to service cloud resources in the cloud environment of a respective tenant, wherein the first high level policy includes a rule for an action to be applied to members of a type of network entity affecting the cloud resources assigned to the first tenant and the first tenant specific policy is a detailed set of rules to service cloud resources including a current list of resources assigned to service the first tenant, wherein the translating enables the first tenant specific policy to identify specific ones of the network entity;

program code, operative to provide a first tenant specific policy for a first tenant of a plurality of tenants serviced by the multi-tenant service;

program code, operative to detect an event relevant to the first tenant specific policy; and program code, operative to reconfigure the first tenant specific policy according to the detected event.

20. The computer program product as recited in claim 19, wherein the computer program instructions further comprise:

program code operative to provide a database for mapping respective tenant specific policies to multi-tenant services;

program code operative to monitor the database for changes;

program code operative to indicate an event relevant to the first tenant specific policy; and program code operative to reconfigure the first tenant specific policy according to the database change.

21. The computer program product as recited in claim 19, and the first high level policy includes a rule for all members of a type of a plurality of cloud resources currently assigned to a tenant and the reconfiguring the first tenant specific policy changes to which ones of the plurality of cloud resources the first tenant specific policy applies, wherein the detected event does not change the first high level policy.

22. The computer program product as recited in claim 21, the computer program instructions further comprising:

program code operative to translate the second high level policy to the second tenant specific policy usable by the multi-tenant service to service resources assigned to the second tenant, wherein the second high level policy is a general set of rules to service resources assigned to the second tenant, wherein the second high level policy includes a rule for an action to be applied to members of a type of network entity affecting the cloud resources assigned to the second tenant and the second tenant specific policy is a detailed set of rules to service resources including a current list of resources assigned to the second tenant, wherein the translating enables the second tenant specific policy to identify specific ones of the type of network entity; and program code operative to send the first tenant specific policy to a first enforcement point assigned to the first tenant and the second tenant specific policy to a second enforcement point assigned to the second tenant.

23. The computer program product as recited in claim 19, further comprising program code operative to determine whether an event is relevant to a tenant specific policy.

24. The computer program product as recited in claim 23, further comprising program code operative to register for notifications of an event relevant to a tenant policy.

* * * * *